US011128484B2

(12) United States Patent
Fahrendorff et al.

(10) Patent No.: US 11,128,484 B2
(45) Date of Patent: Sep. 21, 2021

(54) ADVISING MEETING PARTICIPANTS OF THEIR CONTRIBUTIONS BASED ON A GRAPHICAL REPRESENTATION

(71) Applicant: Mitel Networks (International) Limited, London (GB)

(72) Inventors: Anders Fahrendorff, Ottawa (CA); Darren Mombourquette, Nepean (CA); Mona Abou-Sayed, Frisco, TX (US); Logendra Naidoo, Ottawa (CA)

(73) Assignee: Mitel Networks (International) Limited, London (GB)

( * ) Notice: Subject to any disclaimer, the term of this patent is extended or adjusted under 35 U.S.C. 154(b) by 0 days.

(21) Appl. No.: 17/000,162

(22) Filed: Aug. 21, 2020

(65) Prior Publication Data
US 2021/0058264 A1 Feb. 25, 2021

Related U.S. Application Data

(60) Provisional application No. 62/922,710, filed on Aug. 23, 2019.

(51) Int. Cl.
*H04L 12/18* (2006.01)
*G10L 15/22* (2006.01)

(52) U.S. Cl.
CPC .......... *H04L 12/1831* (2013.01); *G10L 15/22* (2013.01); *H04L 12/1818* (2013.01); *H04L 12/1822* (2013.01)

(58) Field of Classification Search
CPC ............. H04L 12/1831; H04L 12/1818; H04L 12/1822; H04L 43/045; H04L 43/08; G10L 15/22

USPC .......................................................... 709/204
See application file for complete search history.

(56) References Cited

U.S. PATENT DOCUMENTS

| 6,636,888 | B1 * | 10/2003 | Bookspan | G06Q 10/109 709/200 |
|---|---|---|---|---|
| 8,887,068 | B2 * | 11/2014 | Roberts | G06Q 10/10 715/753 |
| 2007/0112926 | A1 | 5/2007 | Brett et al. | |
| 2015/0154291 | A1 | 6/2015 | Shepherd et al. | |
| 2016/0073054 | A1 | 3/2016 | Balasaygun et al. | |
| 2016/0073059 | A1 * | 3/2016 | Bader-Natal | H04L 65/403 348/14.03 |
| 2016/0283816 | A1 * | 9/2016 | Paradkar | G06K 9/6277 |
| 2018/0007100 | A1 * | 1/2018 | Krasadakis | G06Q 10/1095 |
| 2018/0039951 | A1 * | 2/2018 | Wynn | H04N 7/15 |

(Continued)

*Primary Examiner* — Ruolei Zong

(57) ABSTRACT

Systems and methods for advising meeting participants are disclosed. An example method of advising meeting participants includes establishing a desired engagement level for a participant of a meeting. The example method further includes evaluating a contribution to the meeting of the participant based on the desired engagement level and including at least one of detecting a communication duration of the participant or determining a quantity of content shared. The example method also includes generating a graphical representation of the contribution to the meeting. Additionally, the example method includes providing the graphical representation of the contribution to the meeting, including transmitting a signal to at least one of the participant or a meeting host. The signal communicates the graphical representation to a device of the participant or the meeting host.

20 Claims, 9 Drawing Sheets

(56) References Cited

U.S. PATENT DOCUMENTS

2018/0189743 A1\* 7/2018 Balasubramanian .. G06N 5/025
2020/0403817 A1\* 12/2020 Daredia ................ G06F 16/438

\* cited by examiner

ADVISING MEETING PARTICIPANTS OF THEIR CONTRIBUTIONS BASED ON A GRAPHICAL REPRESENTATION

CROSS-REFERENCE TO RELATED APPLICATION

This application claims the benefit of U.S. Provisional Application No. 62/922,710, filed Aug. 23, 2019, and entitled METHODS FOR COLLABORATING AND COMMUNICATING IN MEETING ENVIRONMENTS, the contents of which are hereby incorporated herein by reference, to the extent such contents do not conflict with the present disclosure.

FIELD OF THE INVENTION

The present disclosure generally relates to electronic communication methods and systems. More particularly, examples of the disclosure relate to electronic communication methods and systems suitable for advising meeting participants of their contributions to a meeting.

BACKGROUND OF THE DISCLOSURE

Often the facilitator leading a collaboration session desires to be mindful of the contribution(s) of each participant during the course of the meeting. Sometimes, some participants receive fewer opportunities or do not take advantage of their opportunities to speak, resulting in an imbalance, where participation is not proportionate (relevant to the other participants) or equal.

Some hosts have prepared and can schedule time slots so that each participant has an opportunity to talk. But this can be a time-consuming process and sometimes the meeting is interrupted due to some technical, or unexpected issues. Surveys and studies show that the attitudes towards meetings in general are a waste of time and that the biggest problem faced by such meetings is the unequal participation by the collaborative teams.

One step further is the undesirable effect of a participant who monopolizes the available timeslots of others and this results in an "overkill" scenario where participation is unhelpful or ill-timed.

Accordingly, improved methods and systems for facilitating communication and collaboration during an electronic communication are desired. Any discussion of problems and solutions involved in the related art has been included in this disclosure solely for the purposes of providing a context for the present invention and should not be taken as an admission that any or all of the discussion were known at the time the invention was made.

SUMMARY

An example method of advising meeting participants includes establishing a desired engagement level for a participant of a meeting. The example method includes evaluating a contribution to the meeting of the participant based on the desired engagement level and including at least one of detecting a communication duration of the participant or determining a quantity of content shared. The example method also includes generating a graphical representation of the contribution to the meeting. Additionally, the example method includes providing the graphical representation of the contribution to the meeting including transmitting a signal to at least one of the participant or a meeting host. The signal communicates the graphical representation to a device of the participant or the meeting host.

An example apparatus for advising meeting participants includes at least one processor and a memory coupled to the at least one processor. The memory includes instructions. The instructions cause the at least one processor to establish a desired engagement level for a participant of a meeting. The instructions also cause the at least one processor to evaluate a contribution to the meeting of the participant based on the desired engagement level and include at least one of detecting a communication duration of the participant or determining a quantity of content shared. Additionally, the instructions cause the at least one processor to generate a graphical representation of the contribution to the meeting. The instructions can cause the at least one processor to provide the graphical representation of the contribution to the meeting, including transmitting a signal to at least one of the participant or a meeting host, the signal communicating the graphical representation to a device of the participant or the meeting host.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

The present disclosure relates generally to electronic communication methods and systems. Exemplary electronic communication methods and systems can be used to, for example, facilitate electronic communication with one or more participants. An aspect may be used to advise meeting participants, a meeting host, or management of the participant's contributions to a meeting.

Examples of the disclosure can be used in connection with a variety of applications, including, for example, meeting applications, meeting participation in a collaborative setting, meeting and meeting facilitator evaluation, workload balancing for meeting participants, facilitation of meeting contributions, virtual meeting attendance, generating productivity during meetings, gathering metrics during a meeting, detecting content and contribution redundancy, meeting avoidance, ways to make more effective meetings, dealing with meeting distractions, and graphical representations of meeting activities. Several embodiments are disclosed herein that describe systems, methods, and computer program software products for managing meetings and meeting contributions. Such embodiments include methods to advise meeting participants of their contributions to a meeting.

Figure 1:
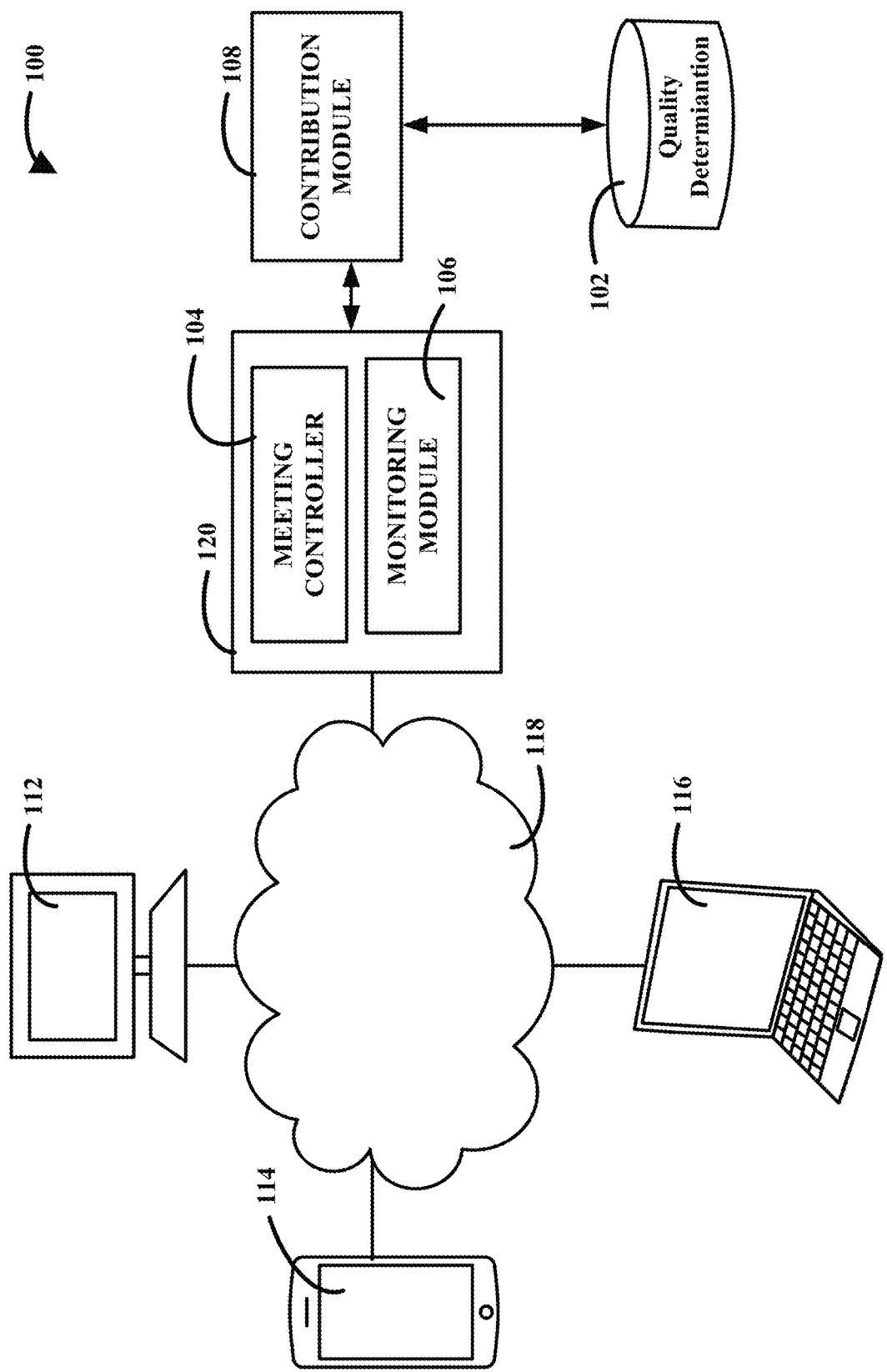
FIG. 1 illustrates a communication system in accordance with various exemplary embodiments of the disclosure.

Turning now to the figures, FIG. 1 illustrates an electronic communication system (or simply system) 100 in accordance with various examples of the disclosure. Electronic communication system 100 includes a database 102 comprising user identification information and/or other user information that may include expected user quality information, a meeting controller 104, a monitoring module 106 to monitor scheduling information for a communication, and a comparison module 108 to compare scheduling information. System 100 can also include one or more devices 112-116, and/or a network 118. Further, as illustrated in FIG. 1, two or more components, such as meeting controller 104 and monitoring module 106, may be part of a communication server 120.

Database 102 can include any suitable database, such as Microsoft SQL Server, MySQL, Microsoft Access, Oracle, etc. Database 102 includes user identification information and quality determination information for meeting participants corresponding to the user information. The user identification information can include any information for uniquely identifying a user in system 100. User identification information can include, for example: username, name, phone numbers, extensions and the like. In an example embodiment, expected user quality information may include an appropriateness level for participation for each participant in a meeting. The appropriateness level for participation for each participant in a meeting may be stored in the database 102.

Meeting controller 104 can include any suitable module for connecting one or more devices (e.g., devices 112-116) to a communication, e.g., a meeting. By way of example, meeting controller 104 can be a standalone module or a module that is part of communication server 120. In accordance with examples of the disclosure, meeting controller 104 is configured to: if a habit for joining a communication exists in the scheduling information, automatically perform one or more of: automatically sending a push notification to join the communication to a user device and automatically joining the user device to the communication, and if a habit for joining the communication does not exist, determining a method used by the user device to connect to the communication and automatically updating the habit information with a habit corresponding to the method used by the user device to connect to the communication. A method used by the user device to join the communication can include, for example, one or more of joining via an application on the user device, requesting a call to the user device to join the communication, requesting a link to join the communication, receiving a pushed call to the user device to join the communication, and receiving a pushed link to join the communication. Meeting controller 104 can also be configured to determine a type of device of the user device (e.g., mobile, desktop, or the like) and to include the device type in the habit information.

As used herein, "module" can refer to computer program instructions encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., solid-state memory that forms part of a device, disks, or other storage devices). By way of examples, meeting controller 104 can include a conference and/or collaboration system available from Mitel.

Monitoring module 106 is configured to monitor scheduling information for a communication. By way of examples, monitoring module 106 can review calendar information for one or more users (e.g., at a set time interval before a communication is to start) to determine whether any habits have been specified. The scheduling information can include, for example, a reminder that a meeting is about to start.

Contribution module 108 uses a processor to compare meeting participant contributions to an appropriateness level for participation for each participant in a meeting stored in the quality determination database 102. For example, contribution module 108 can determine whether one or more participants meet or exceed the appropriateness level for participation for each participant in a meeting. Contribution module 108 can also determine whether one or more participants fail to meet the appropriateness level for participation for each participant in a meeting.

Communication server 120 can be or include any suitable server. Communication server 120 can perform various functions as described herein. For example, communication server 120 can provide electronic communication (e.g., audio, video, text, and/or email) links between one or more devices 112-116. In accordance with an example of the disclosure, communication server 120 may include a private branch exchange (PBX) server or other communication circuitry.

Devices 112-116 can be or include any suitable device with wired or wireless communication features that can connect to network 118. For example, devices 112-116 can include a wearable device, a tablet computer, a wired phone, a mobile phone, a personal (e.g., laptop or desktop) computer, a streaming device, such as a game console or other media streaming device, or the like. One or more of devices 112-116 can include an application or client to perform various functions set forth herein and/or to cause to be displayed, text and/or other information as described herein.

Network 118 can include or be, for example, an internet protocol (IP) network. Exemplary types of networks suitable for communication with network 118 can be or include a local area network, a wide-area network, a metropolitan area network, wireless networks, a private branch exchange (PBX), or a portion of the Internet. Various components of network 118 can be coupled to one or more other components using an Ethernet connection, other wired connections, and/or wireless interfaces. Network 118 can be coupled to other networks and/or to other devices typically coupled to networks. By way of particular example, network 118 includes a communication network and network 118 can be coupled to additional networks, such as a public switched telephone network (PSTN) or the like, that can be coupled to one or more devices, such as devices 112-116.

Companies around the world have tried to optimize engagements made during meetings. For example, companies have tried to optimize engagements by measuring the engagements. Companies have also tried to optimize engagements by taking actions to increase the engagements. The process of optimizing the engagement has usually been very labor-intensive. For example, some solutions provide indications such as which participant is speaking, evaluate the participant's speech time slot as well and create a report about the participant's speech time slot.

Facilitators may have to analyze the reports by themselves and advise the participants that, for example, "your contributions are infrequent, please contribute more." These more informal reports may be somewhat subjective and arbitrary to measure the participant's contributions because the reports do not provide any solutions to engage participants in real-time and are a "post-mortem" type of indicator, i.e., after the meeting is over.

Some solutions are based on peer evaluation. A solution based on peer evaluation may measure the performance of the collaborative group and mark the collaborative group accordingly. An example of a peer evaluation is a team leader remarking "John, I noticed that during the status update, you said very little" to which the employee responds, "Really? I felt that the cross-chatter by Amy was a bit much, so I stayed quiet for that reason."

Previous solutions include Adobe Connect's "Engagement Dashboard," Zoom's Webinar reports, and Visualizing Meetings as a Graph for More Accessible Meeting Artifacts. The Engagement Dashboard is a graphical index or meter. The graphical index or meter gives presenters a visual, "birds-eye view" of the audience's overall engagement level. As a result, questions and answers, interactive polls, file downloads, and participant chats are all measured in real-time and assigned a visual score. The score is measured over 1 minute, with various activities contributing different point values. The meter is refreshed every 1-2 minutes, and a report is available as part of the post-meeting analysis.

Zoom's Webinar reports provide data on registration, attendees, questions and answers, polling, and event performance. Zoom's Webinar generates reports to gain insights from questions and answers, identify your registrant/attendee ratio, and review engagement statistics.

Visualizing Meetings as a Graph for More Accessible Meeting Artifacts may be used for visualizing the history of a meeting as a graph. The graph may not only give the list of participants, but the participants' roles and contributions, and how the participants were involved in decision making along with the relations between participants.

An example embodiment may measure contributions of each participant, determining when participation-related goals are met, and prompt and advise the participant, a host, a facilitator, or a combination of these during a meeting.

Figure 2:
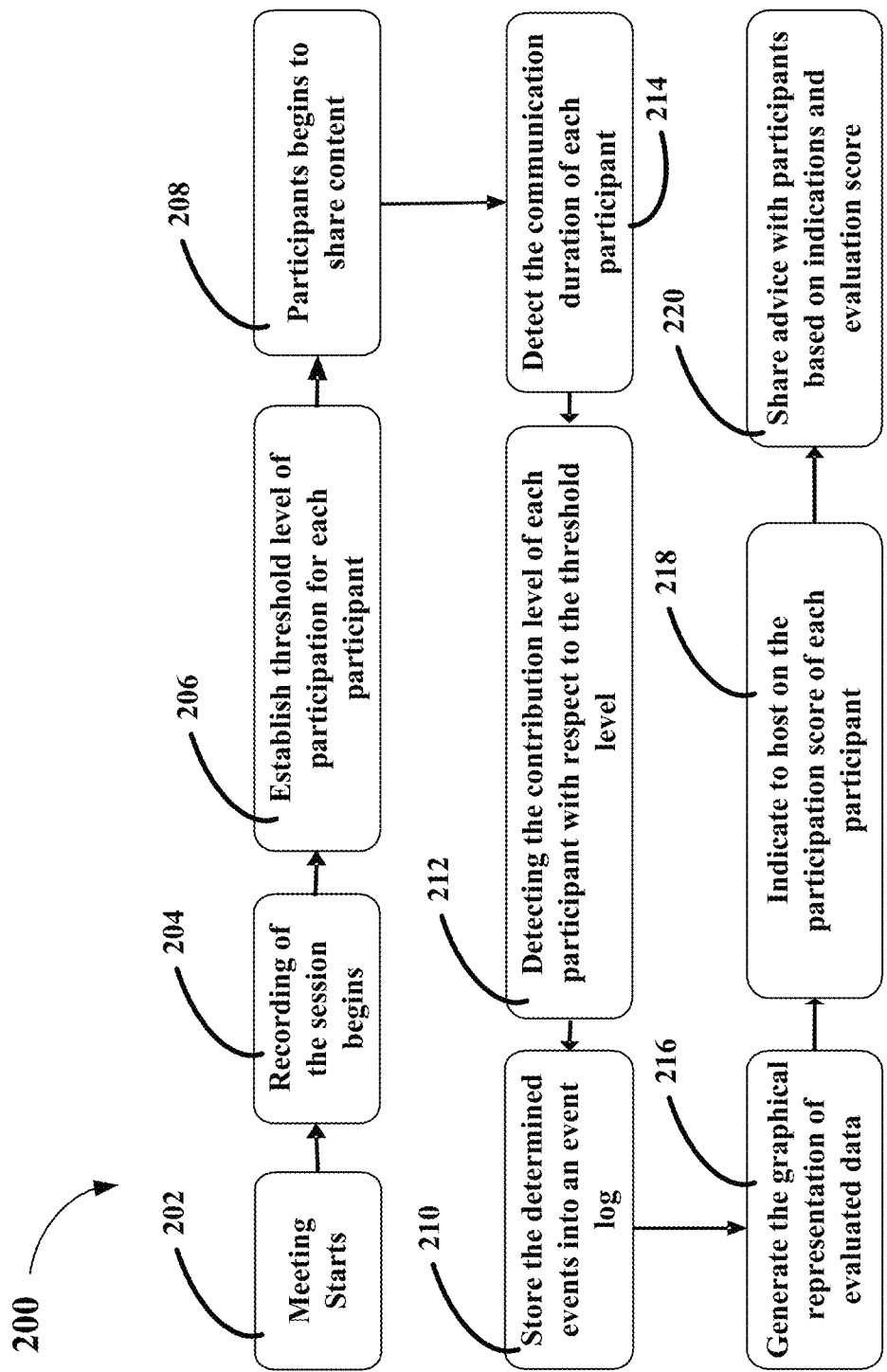
FIG. 2 illustrates a flow diagram and method in accordance with exemplary embodiments of the disclosure.

FIG. 2 illustrates a flow diagram and method 200 in accordance with exemplary embodiments of the disclosure. In an example implementation of the method 200, a meeting may start (202). For example, a device may transmit and receive signals allowing geographically diverse participants to hear and/or see each other or meeting materials during the course of a meeting. Further, some participants may not be geographically diverse. These participants may be in a conference room at a particular location, for example. Meeting communications from that conference room may, however, be transmitted to one or more other geographically diverse meeting participants. The systems and methods described herein may differentiate between different meeting participants that are in the same location, e.g., using voice recognition or other processing.

Recording of the meeting session may begin (204). For example, the transmissions of the meeting may be received at one or more servers that may record the audio, video, or other data from the transmissions. Optionally, the method 200 may establish an appropriateness level for participation for each participant (206). In an example, determining the appropriateness level for participation for each participant may be performed by a facilitator or be management defined. Establishing the appropriateness level for participation for each participant may occur when the appropriateness level for participation for each participant is stored by a device implementing the method. For example, the one or more servers may store the appropriateness level for participation for each participant.

The participants may begin to share content (208). For example, the participants may speak over their respective transmission or present meeting materials over the transmission to other meeting participants. The participants' content may be monitored to detect the contribution level of each participant with respect to a threshold level (212). For example, a participant's quantity of participation in a particular discussion may be determined. The participant's contribution or expertise level may be analyzing, and the contribution of each attendee may be analyzed so that determined events may be stored into an event log (210).

In the example, a graphical representation depicting participant contributions may be prepared or generated (216). The graphical representations may depict participant contributions and may be one or more of "heat maps," classic metering, scoring, or other graphical representation that may be used to depict participant contributions. In an example, the data may be analyzed and presented in a predetermined graphical format such as those described with respect to FIGS. 4-8.

Depicting the graphical representation may provide indications to host or facilitator of participant contributions (218). Accordingly, a host or facilitator may adjust the degree of intervention of concerned participants. In the example, the advice may be used to guide the participants by sending either pop up messages, customized text messages, color indications, or timer when to respond in a discussion to share the advice with participants based on indications and the evaluation score (220).

Figure 3:
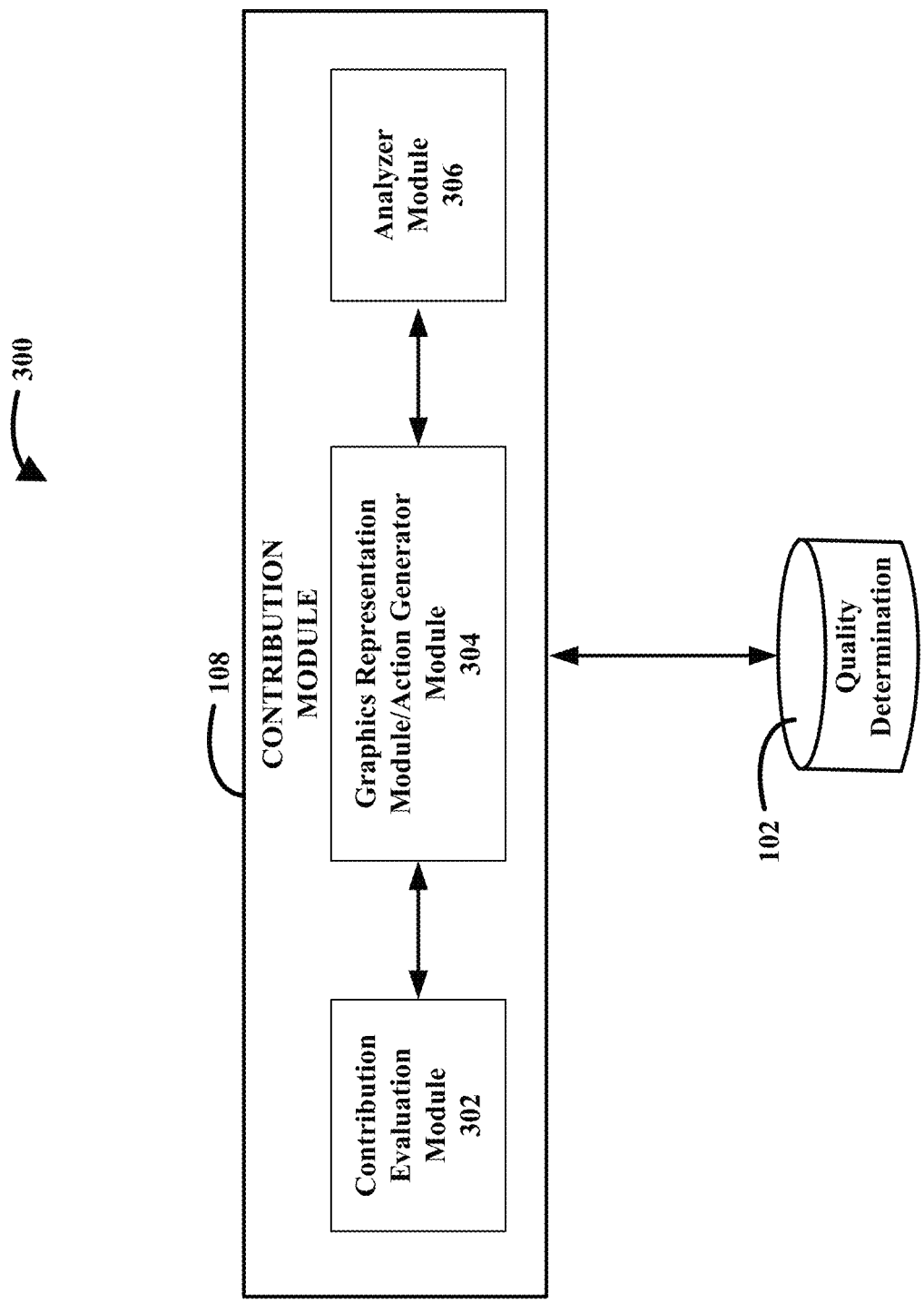
FIG. 3 illustrates an example system in accordance with exemplary embodiments of the disclosure.

FIG. 3 illustrates an example system 300 in accordance with exemplary embodiments of the disclosure. The system 300 may be a sub-system of the electronic communication system 100 of FIG. 1. The system 300 may be used to analyze meeting participant contributions. For example, the system 300 may include contribution module 108 and quality determination database 102. The contribution module 108 may include contribution evaluation module 302 and analyzer module 304.

Contribution evaluation module 302 may be used to determine a participant's quantity of participation in a particular discussion. For example, the contribution evaluation module 302 may monitor the participants' content to detect the contribution level of each participant with respect to a threshold level. The contribution evaluation module 302 may analyze the participant's contribution and/or expertise level by analyzing the contribution of each attendee.

Graphical representation module 304 may prepare graphical representations depicting a participant's contributions. Example graphical representations depicting a participant's contributions may include, but are not limited to "heat maps," classic metering, scoring, or other graphical representations.

Analyzer module 306 may determine the graphical scores of each participant. Analyzer module 306 may also provide indications to the host and/or the facilitator. Additionally, analyzer module 306 may facilitate or adjust the degree of intervention of concerned participants. Analyzer module 306 may also advise and/or guide the participants by sending either pop up messages, customized text messages, color indications, or timer when to respond in a discussion.

An example embodiment aims to measure the participant's contribution during a collaboration session and increase the participant's participation accordingly. The method of this embodiment does not simply report metrics; however, rather, the method may be able to create targets that establish measurable goals for each participant and then ensure the participants meet those thresholds through automation and notification functions.

In an example embodiment, the proposed features provide a method that may include one or more of establishing a desired engagement level (e.g., participation) for each participant by a facilitator or management defined, evaluating each participant's contribution in real-time based on the desired engagement level(s), providing a graphical representation of each participant's contribution such as heat maps, scoring, graphs, classic metering, etc., tracking the participants during the collaborative sessions (e.g., live in-person, online, or a combination of both) using speech recognition techniques such as speech format attribute detection or device detection or caller-ID recognition, or other speech recognition techniques.

To record the evaluated metrics and the gathered information about each participant's speech duration and their continued involvement. The metrics are gathered and maintained for each speaker, for example, frequency of words spoken, speaker duration, primary engagers (i.e. when you speak this person interacts with you the most). The proposed method may also include one or more of signaling the participants or host according to their evaluated results metrics. For example, if a participant has a lower value, the system prompts her/him to speak and others to stop. In an example embodiment, the system may prompt a participant to become less engaged when someone else, such as the host, talks. For example, the host may be changing topics or discussing the same topic. The host could be prompting another participant to speak, or otherwise directing the meeting. In an example embodiment, the signal may be a pop-up messages, customized text messages, or color indication like red for low participation, yellow for warning about low participation, and green for good participation level.

The systems and methods described herein may show the profiled data to the participants and make amendments according to the important information given by them so that, the participants may show their level of importance in the meeting and make themselves more engaged. The system can create a sense of competition among participants by evaluating a heatmap, advising participants, and showing the participant's scoring.

Systems and methods for video conferencing may be expected to be in demand worldwide. The global video conferencing market size was valued at 3.85 billion U.S. dollars in 2019 and is expected to register a compound annual growth rate (CAGR) of 9.9% from 2020 to 2027. Increasing the adoption of technologies, such as facial recognition, to detect and authenticate the meeting participants may significantly boost the growth of the market.

Various embodiments may include one or more of the following possible variations. One example variation may allow the system to help a participant to engage the other participants more effectively in a meeting equally using a "contribution" function and encouraging the participants to share the participant's ideas during discussions. The "contribution" function may evaluate and score a participant's contribution and provide the evaluation or score to the participant, to other participant's, to the host or facilitator, to management, or to some combination of the participant, to other participant's, to the host or facilitator, and management. An embodiment may include visual cues that may be used in real-time to steer the conversation towards the meeting goals.

Some embodiments may not be limited to live meetings in companies. For example, an embodiment may be used in any online discussion application platform. An embodiment may be used in connection with online classrooms, general meetings, training sessions, online gaming, reality shows, news, brainstorming sessions, or other online discussion application platforms.

In an example virtual classroom environment, the system may evaluate and create a student's heat-map related to participation during the meeting, and advise the teacher to select the student and tell him (or her) to speak. Once selected, a video of that student may be displayed. The heat-map may help the teacher to engage the students more and make the lecture productive.

The proposed system may integrate the online collaborative platform with advanced techniques which may help the system continuously track the participants and may help in the decision-making process. The system may rely on data gathering by algorithms or different processing modules instead of manual inputs and may evaluate the participant's contribution using the methods described herein. The proposed collaboration system may be configured to measure the contributions of the system's participants and present the contributions using graphical representations (e.g., "heat maps," classic metering, scoring, or other graphical representations).

Referring back to FIGS. 1-3, the method may include participants logging in to the meeting application on the communication server 120. A facilitator may establish a threshold level of participation for each participant logged into the meeting on the meeting application. Participants may be recognized by their caller ID or name or another identifiable factor. The system 100 may store these in a database. The contribution evaluation module 302 may identify events related to the actions of participants during the virtual meeting. Types of events may include speaking events comprising periods during which one or more of the participants speak during the virtual meeting. Evaluated metrics may be gathered and maintained for each speaker, for example, frequency of words spoken, speaker duration, primary engagers (e.g., when you speak this person interacts with you the most).

In an example embodiment, typed comments may also be quantifiable when submitted by participants during the virtual conference. Accordingly, the contribution evaluation module 302 may evaluate typed comments. In an example embodiment, the moderator or other participant may bookmark events during the virtual conference indicating points in time which the moderator or other user may wish to refer back, e.g., after the meeting.

The contribution evaluation module 302 may evaluate the participation level of each participant with respect to the established threshold level. An event log may store the metrics identified by the contribution evaluation module 302.

A graphics representation module or an action generator module 304 may prepare a graphical representation (e.g., "heat maps;" classic metering, scoring, or other graphical representation) that may help the system to analyze each participant's contribution to the meeting.

The graphics representation module or the action generator module 304 may prompt or trigger indications to participants or facilitators to engage less in the meeting or more in the meeting. The indications may be visual (e.g., via a pop-up window) or audible (e.g., via an alarm or ringtone). Visual indications may also be color indications (red, yellow, green). For example, a window having a view of a particular user in an online conference may have a border and the border may be a color such as red, yellow, or green, depending on the desired indication, e.g., red for no participation, yellow for too little participation or perhaps too much participation, and green for an adequate amount of participation. The levels of participation may be based on a desired amount for the particular participant and may vary from participant to participant. For example, some participants may be expected to run the meeting and participate a high percentage of the time, while other participants may be considered observers and may not be expected to participate actively. Furthermore, some participants may be expected to have levels of participation between these two extremes.

In an example embodiment, the proposed system may offer an automated way to reduce the pressure on a worker in self-determining how much they should contribute and as a result these systems may facilitate improved meeting performance and optimize the meeting overall for others as a result. Ideally, then when a participant feels "Hey, I felt like I did all the talking," but they then review their heat map report and the participant can see the metrics show how she or he met their targets in comparison to other participants.

Each participant may be appropriately responsive and dedicated to their involvement in the collaborative group. Sometimes this may depend on the functional team being represented and the required participation. Valid and reliable measurement of each participant's contribution in a collaborative environment may stimulate the participants to perform better in meetings being commensurate with their defined roles. To ensure a more useful collaboration model for business-minded organizations, it is very important to measure the contribution of each of the members and then advise them according to their role-defined benchmarks.

Figure 4:
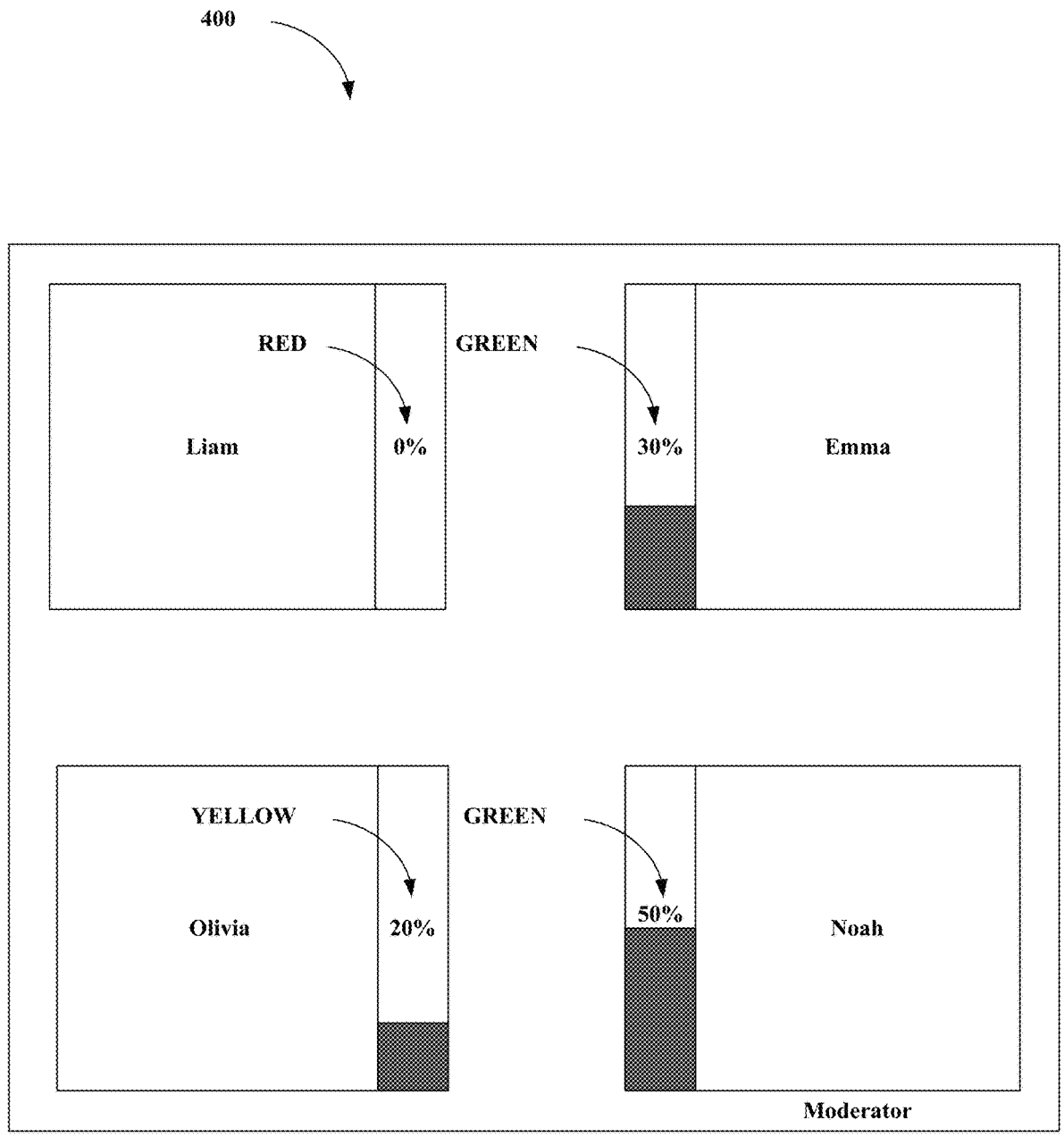
FIG. 4 illustrates an example graphical representation of a contribution to a meeting in accordance with exemplary embodiments of the disclosure.

FIG. 4 illustrates an example graphical representation 400 of a contribution to a meeting in accordance with exemplary embodiments of the disclosure. Color coding may be used. The color coding is indicated by the words "RED," "YELLOW," and "GREEN" on the figure because the actual figures are in black and white. For example, the background of the graph may be one or red, yellow, or green. In another embodiment, the numerical values may be red, yellow, or green. In yet another embodiment, the background of the graph may be one or red, yellow, or green and the numerical values may be a darker shade of red, yellow, or green, e.g., generally following the background color.

The graphical representation illustrates a meeting with four participants, "Liam," "Emma," "Olivia," and "Noah." Liam has not participated and has 0% participation. In this example, Liam is not an observer and may have some expectation of participation. Accordingly, a red indication is given for the lack of participation. Emma has participated 30% of the time, which is an acceptable level of participation for her role. Accordingly, a green indication is given for the level of participation. Olivia has participated 20% of the time, which may be slightly below an acceptable level of participation for her role. Accordingly, a yellow indication is given for the level of participation. Noah has participated 50% of the time and is the moderator. A high level of participation may be expected of the moderator. Noah's 50% participation level may be an acceptable level of participation for his role. Accordingly, a green indication is given for the level of participation. Using the color-coded indications, each participant may determine their level or participation relative to what is expected of them.

Figure 5:
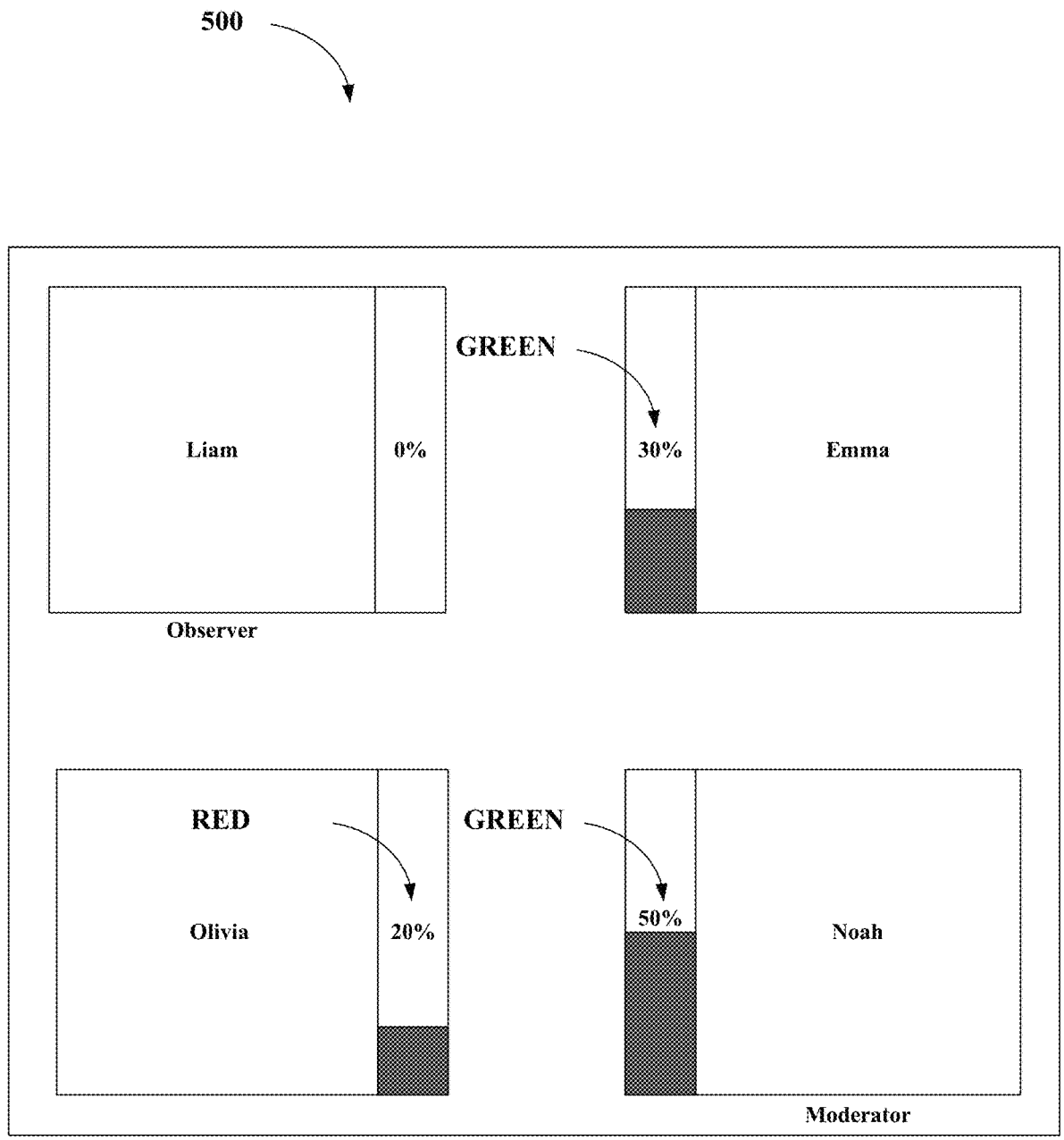
FIG. 5 illustrates another example graphical representation of a contribution to a meeting in accordance with exemplary embodiments of the disclosure.

FIG. 5 illustrates another example graphical representation 500 of a contribution to a meeting in accordance with exemplary embodiments of the disclosure. The graphical representation 400 of FIG. 4 and the graphical representation 500 of FIG. 5 are generally similar. The graphical representation again illustrates a meeting with the four participants, "Liam," "Emma," "Olivia," and "Noah." Liam again has not participated and has 0% participation. In this example, however, Liam is an observer. For an observer, it may be assumed that a low or minimal, or even no participation may be an acceptable level of participation. Accordingly, no red indication is given for the lack of participation. Emma again has participated 30% of the time, which is an acceptable level of participation for her role. Accordingly, a green indication is given for the level of participation. Here Olivia again has participated 20% of the time, which may, for this example, be more than slightly below an acceptable level of participation for her role. Accordingly, a red indication is given for the level of participation. Noah has participated 50% of the time and is the moderator. A high level of participation may again be expected of the moderator. Noah's 50% participation level may be an acceptable level of participation for his role. Accordingly, a green indication is given for the level of participation.

Figure 6:
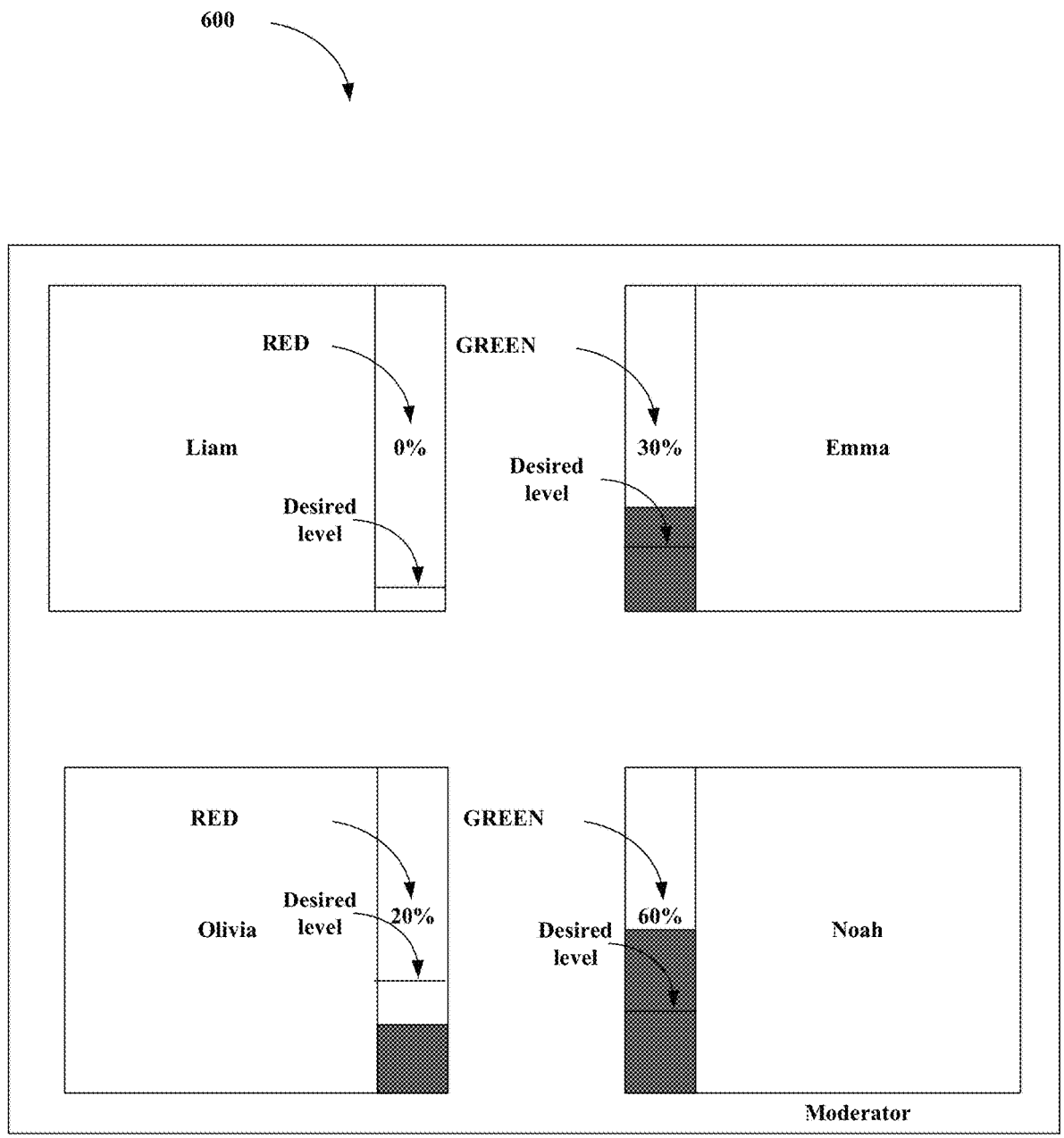
FIG. 6 illustrates another example graphical representation of a contribution to a meeting in accordance with exemplary embodiments of the disclosure.

FIG. 6 illustrates another example graphical representation 600 of a contribution to a meeting in accordance with exemplary embodiments of the disclosure. The graphical representation 400 of FIG. 4 and the graphical representation 500 of FIG. 5 are generally similar to the graphical representation 500 of FIG. 5. In this example, Liam is not an observer and may have some expectation of participation, which is indicated on the graph. The level of participation (0%) falls below the desired level of participation for Liam. Accordingly, a red indication is given for the lack of participation. Emma again has participated 30% of the time, which is an acceptable level of participation for her role. A desired level of participation for Emma is also illustrated and 30% is above this line. Accordingly, a green indication is given for the level of participation. Here Olivia again has participated 20% of the time. The acceptable level of participation is illustrated as the desired level of participation on the graph. The 20% participation is below an acceptable level of participation for her role. Accordingly, a red indication is given for the level of participation. Noah has participated 50% of the time and is the moderator. This is above the desired level of participation. A high level of participation may again be expected of the moderator. Noah's 50% participation level may be an acceptable level of participation for his role. Accordingly, a green indication is given for the level of participation.

Figure 7:
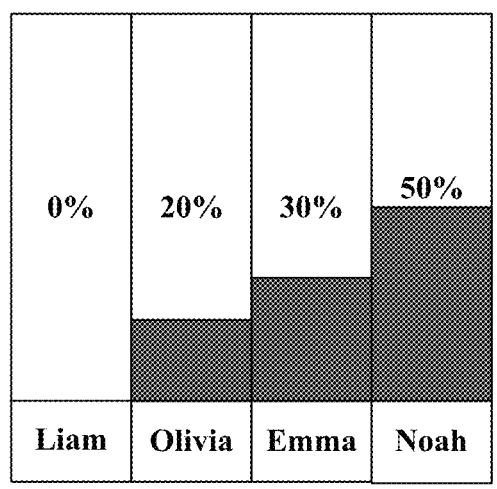
FIG. 7 illustrates another example graphical representation of a contribution to a meeting in accordance with exemplary embodiments of the disclosure.

FIG. 7 illustrates another example graphical representation 700 of a contribution to a meeting in accordance with exemplary embodiments of the disclosure. The graphical representation 700 of a contribution to a meeting in FIG. 7 is a basic graph. The graph illustrates the four participants, "Liam," "Emma," "Olivia," and "Noah" across the horizontal axis of the graph (typically referred to as the x-axis). The graph illustrates different percentages along the vertical axis of the graph (typically referred to as the y-axis). Liam again has 0%, Olivia again has 20%, Emma again has 30%, and Noah again has 50%. The order of the participants has been arranged from low to high in the example of FIG. 7, however, it will be understood that any order may be used, including a random order, an order from highest participation to lowest participation, an order with moderator first, or any other order.

Figure 8:
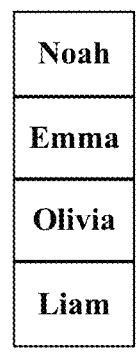
FIG. 8 illustrates another example graphical representation of a contribution to a meeting in accordance with exemplary embodiments of the disclosure.

FIG. 8 illustrates another example graphical representation 800 of a contribution to a meeting in accordance with exemplary embodiments of the disclosure. Participation levels are not illustrated in FIG. 8. The graphical representation 800 of FIG. 8 may use color coding to indicate users that may need to participate more. The color coding is indicated by the words "RED," "YELLOW," and "GREEN" on the figure because the actual figures are in black and white.

In this example, Liam is not an observer and may have some expectation of participation. Accordingly, a red indication is given for a lack of participation. Assuming Olivia again has participated 20% of the time, a yellow indication may be given for that level of participation. Assuming Emma again has participated 30% of the time, which is an acceptable level of participation for her role, a green indication is given. Noah has participated 50% of the time and is the moderator. A high level of participation may be expected of the moderator. Noah's 50% participation level may be an acceptable level of participation for his role. Accordingly, a green indication is given for the level of participation. Using the color-coded indications, each participant may determine their level or participation relative to what is expected of them.

Figure 9:
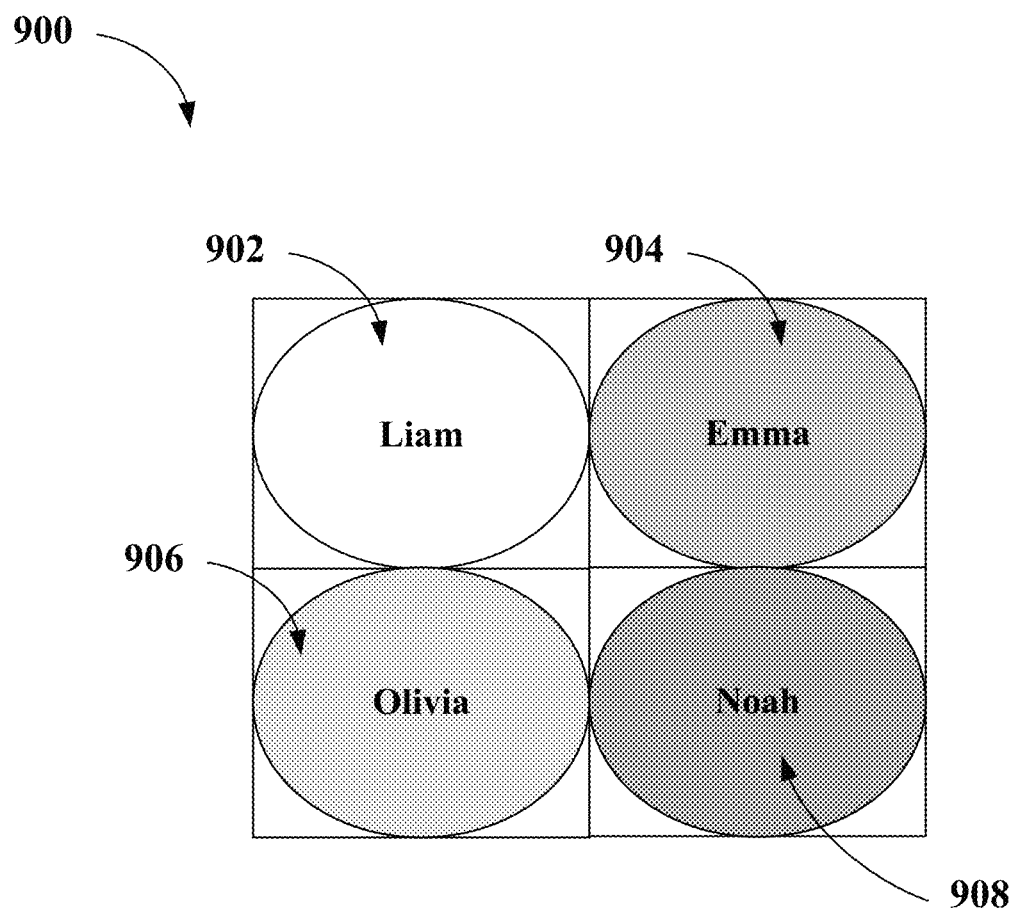
FIG. 9 illustrates another example graphical representation of a contribution to a meeting in accordance with exemplary embodiments of the disclosure.

FIG. 9 illustrates another example graphical representation 900 of a contribution to a meeting in accordance with exemplary embodiments of the disclosure. The graphical representation 900 of a contribution to a meeting in FIG. 9 may be based on shading, e.g., from least contribution to highest contribution. For example, Liam may have 0% participation and 0% shading. Olivia may have 20% participation and 20% shading. Emma may have 30% participation and 30% shading. Noah may have 50% participation and 50% shading. The example of FIG. 9 illustrates a direct mapping between participation and shading, e.g., 50% participation and 50% shading, 0% participation and 0% shading. It will be understood that other mappings between participation and shading are also possible, e.g., 50% participation and 25% shading. Furthermore, the mappings need not be linear. For example, a non-linear mathematical function may be used to map participation to shading.

Figure 10:
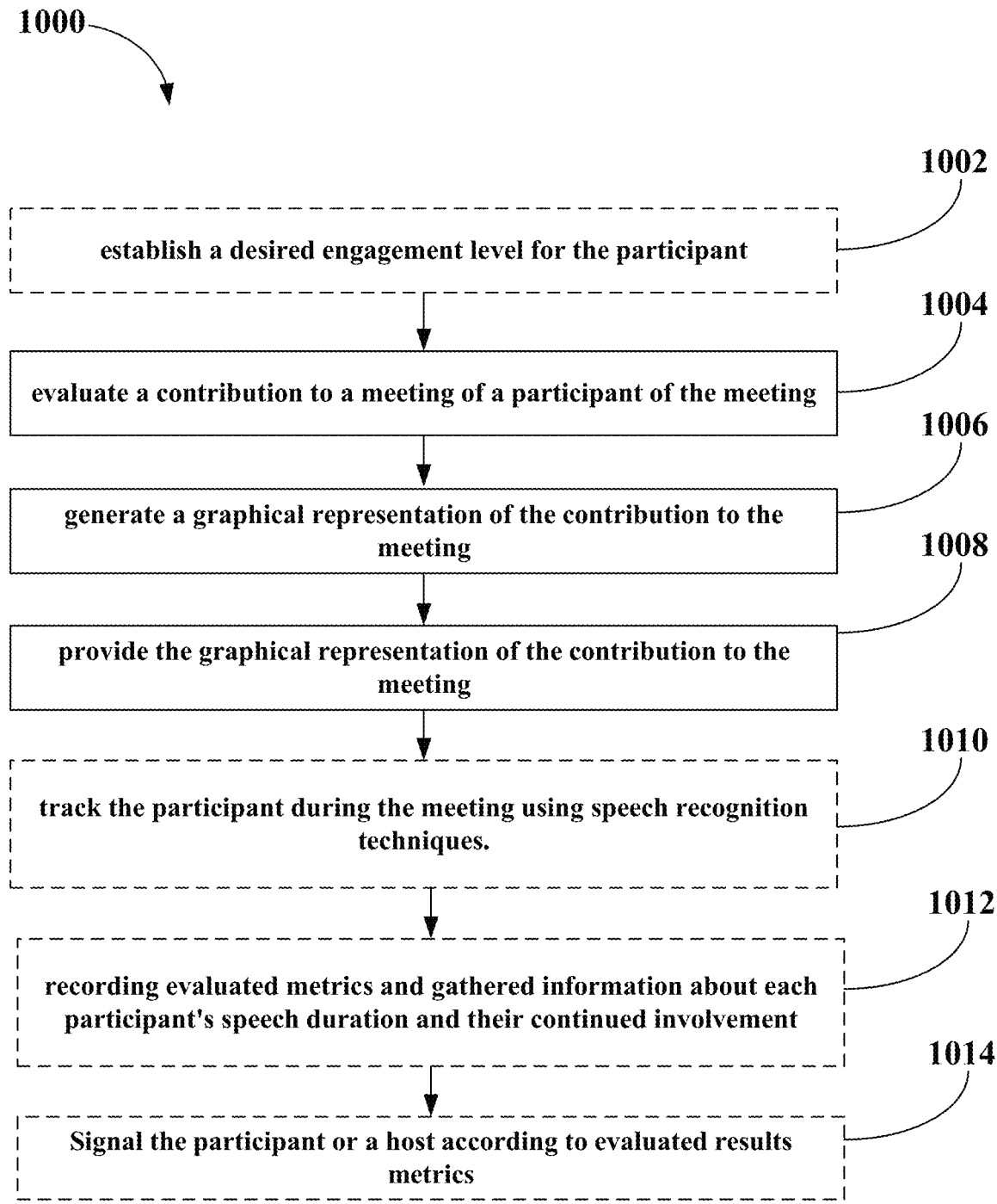
FIG. 10 illustrates a flow diagram and method in accordance with exemplary embodiments of the disclosure.

FIG. 10 illustrates a flow diagram and method 1000 in accordance with exemplary embodiments of the disclosure. The method 1000 is a method of advising participants of the participant's contribution level in real time in a collaborating event. In an example embodiment, the method 1000 includes establishing a desired engagement level for the participant (1002), evaluating a contribution to a meeting of a participant of the meeting (1004), generating a graphical representation of the contribution to the meeting (1006), providing the graphical representation of the contribution to the meeting (1008), tracking the participant during the meeting using speech recognition techniques (1010), recording evaluated metrics and gathered information about each participant's speech duration and their continued involvement (1212), and signaling the participant or a host according to evaluated results metrics (1214).

In an example embodiment, the method 1000 includes establishing a desired engagement level for the participant (1002). Establishing a desired engagement level for the participant may include establishing a threshold level of participation for each participant.

The method 1000 includes evaluating a contribution to a meeting of a participant of the meeting (1004). In an example, evaluating a contribution to a meeting of a participant of the meeting may include detecting a communication duration of each participant in a discussion and/or determining quantity of content shared in the communication duration of each participant in the discussion. In an example, evaluating a contribution to a meeting of a participant of the meeting may include determining contribution level of each participant in the discussion with respect to the threshold level, in response to detecting the quantity of content shared in the communication duration.

The method 1000 includes generating a graphical representation of the contribution to the meeting (1006). Generating a graphical representation of the contribution to the meeting may include generating a graphical representation of the contribution level of each participant of a number of participants of a meeting. For example, data may be collected for each participant and the data may be transformed for presentation in a graphical form.

The method 1000 includes providing the graphical representation of the contribution to the meeting (1008). In an example embodiment, providing the graphical representation of the contribution to the meeting may include sharing the graphical representation with each participant and advising the participants whose contribution level is above or below the predefined threshold level to change their contribution level in the collaborating event. In an example embodiment, providing the graphical representation of the contribution to the meeting may include transmitting the graphical representation to a participant, host, or others.

The method 1000 includes tracking the participant during the meeting using speech recognition techniques (1010). Tracking the participant during the meeting using speech recognition techniques may include receiving speech related signals and processing the speech related signals to identify the participant during the meeting.

The method 1000 includes recording evaluated metrics and gathered information about each participant's speech duration and their continued involvement (1212). Recording evaluated metrics and gathered information about each participant's speech duration and their continued involvement may include generating evaluated metrics and information and storing the evaluated metrics and information to a database.

The method 1000 includes signaling the participant or a host according to evaluated results metrics (1214). Signaling the participant or a host according to evaluated results metrics may include transmitting evaluated results metrics over a communications system such as over the air, over a landline telephone, over a satellite link, over an internet connection, or over a combination of these or other communication systems.

In an embodiment, the communication duration may be at least one of a speech, chat, or video duration or any combination thereof of each participant in the discussion.

In an embodiment, the contribution level of each participant is a frequency of words spoken by each participant.

In an embodiment, advising the participants may be executed by sharing at least one of a color indication, alarm, or popup message.

In an embodiment, a facilitator advises the participants about their contribution level.

Systems and methods can optionally include one or more additional features presented below.

A. Optimizing Meeting Participation by Adding Measurable Outcomes

The methods of the current embodiment provide for optimizing meeting participation by adding measurable outcomes. This can be achieved, for example, by establishing goals, yet requiring participation in achieving those goals measurably is not supported in existing embodiments. For example, adding attachments is a fairly static approach to share information (in a meeting invitation) with minimal impact or strategic purpose. By associating measurable outcomes (such as goals) and allowing participants to suggest a new goal that is partially (or completely) fulfilled is much more collaborative and novel, as compared to a traditional meeting invitation (that uses static text to infer an outcome).

The benefits of this embodiment include, but are not limited to, attendees join meetings with punctuality and with an awareness of the goals of the meeting. All of the meeting data, such as agenda, goals, documents, and notes, are all together in one locale and provide an audit trail of the dialogue within.

Method steps of this embodiment include:
(1) Sending a meeting invitation.
(2) Adding in measurable outcomes, such as goals.
(3) Tying in an agenda that is less uncoordinated and more autonomous.
(4) Adding documents that are associated with stakeholder representation and key dependencies.

B. Adapting Social Media Spaces for Meeting Invitations

The methods of the current embodiment provide for embedding forum-like discussions in what would otherwise be static invitations. Meetings typically contain a pane or section for additional information like agenda topics and conference coordinates.

Method steps of this embodiment include:
(1) User inputs content into a field, such as updating an agenda.
(2) Other users can see the same updates; however, the updates to the invitation need to be submitted (i.e., sent) before other users can see the updates.
(3) A real-time forum-based discussion is added to the meeting construct.

The benefits include, but are not limited to (i) similar to having an inbox within an email or, in this case, a calendar invitation, and (ii) all participants are able to converse within the meeting invitation, thereby ensuring all of the meeting data, such as agenda, goals, documents, and notes, are together in one place and provide an audit trail of the dialogue within.

(4) Users are able to socialize within the forum chat and spawn further threaded discussions embedded within calendar invitation.
(5) Participants can vote on the content within the forum-chat, including adding images, text and emojis.
(6) It is also possible to convert participant's contributions (agenda items and notes) into actionable items (i.e., Task 1, Task 2, etc.).

C. Feedback Mechanism to Improve Conference Media Stream Quality

Methods of the current embodiment provide recommendations to users to optimize video and audio. While older systems typically poll the user, e.g., "how was the quality?;" systems do not recommend to users real-time any actions to be taken ASAP to improve the quality "on the fly."

Method steps of this embodiment include:
(1) A user is engaged in a media-based communications session, such as a video call or a voice call.
(2) System detects a factor or series of factors affecting the media quality, which can result in an action to bypass the problem.
(3) System proactively suggests a highly likely contributing factor affecting media stream quality to equip the user with key knowledge to troubleshoot an issue.

For example, if user Tristan is rustling papers, the interface, in accordance with an embodiment, may prompt the user and state "you're being kind of loud at your conference location," . . . etc. Another example may be if a YouTube™ or Netflix™, or similar type session is running, the exemplary system may recommend, "Tristan, a web session running in the background is affecting the conference video quality. Consider turning it off." And another, when echo is detected, the exemplary system recognizes that Sonny has not yet turned off his microphone.

D. Professional Spaces within a Meeting Environment for Purposes of Collaboration Methods of the current embodiment provide a means for all meeting stakeholders to serve up content that is associated with their profile (such as their work-related files) and that such content would be pertinent to the meeting's goals/stakeholders. The user then always has content or related other goals OR part to contribute to the bigger picture (project related) being published within the meeting apparatus.

Today, this might include a web link to an external networked or cloud-based storage site; however, the proposal is to embed the critical meeting resources for a participant with their tasks, goals, and/or meeting-related requirements. Often, users see an interface link or button for more information; however, in a meeting-oriented apparatus, such as an event scheduling or calendar application, this is absent.

Method steps of this embodiment include:
(1) Users within a workgroup have tasks that are being managed within a larger objective-oriented framework (i.e., tracked tasks and measurable outcomes).
(2) A meeting is called by a key stakeholder and invites one more member of the workgroup.
(3) Specific goals or tasks are included in the meeting invitation and this includes actionable items, such as expectations to complete a task with a measurable outcome ("Deliver draft specification for team review by DATE.").
(4) The user identified within the requirements for the meeting may set their presence indication to "ALL" or "Some" of the tasks have been completed.
(5) Meeting participants can then click on a user's profile to see the relevant files that are "pushed" by a user for the meeting at hand.

For example, the current embodiment may include the following:
Background (old): During the meeting, "I'll send you that file."
Invention (new): "Sonny, help yourself—the specification we all need to review is under my profile."

E. Interacting with Transcribed Content to Improve Productivity

Methods of the current embodiment provide for live transcription to generate content over which participants can collaborate to improve productivity. Live transcribing of meeting proceedings or communication sessions leads to a raw-data view, which, once analyzed, can be processed through NLP techniques to produce meeting highlights. These highlights can then be tagged to create autonomously derived decision-points, then even assigned to the key participants who were speaking during the segment of relevance in the meeting (or outside of the meeting). Furthermore, load-balancing based on the tagging action may help to avoid over-tasking an individual already identified as a participant with a workload that has been identified within a meeting apparatus.

Method steps of this embodiment include:
(1) Meeting or communication session (recording a live meeting or speaking during a phone call) between participants is underway.
(2) A transcription is created as a real-time event OR resulting from post-processing.
(3) The transcription is analyzed using natural language processing techniques to parse the segments into discrete word phrases, where the determination of keywords results from a comparison to a corpus, then filters are applied to determine the keywords that form the basis of topics and actionable phrases ("take the action"+{verb phrase}+{noun phrase}, etc.) as an exemplification of a process.
(4) The meeting or communication system can then create task-flows and/or summary-reports of the artifacts resulting from the discussion to track outcomes OR simply inform the participants over what was said in terms of highlights.

Advantageous aspects of the current embodiment may include, but are not limited to:
converts content into actionable items. This can be done by the stakeholders OR automatically using NLP and machine learning;
automates the note-taking process, where verbatim accounts are less helpful;
empowers meeting participants to be more productive and listen with fewer distractions;
distills rambling discussions into key points, pending decisions, actions, etc.; and
provides useful metrics regarding proportion of meeting spent on topics, or off-topic.

F. Meeting Content and Facilitator Scoring to Enhance Collaboration and Intellectual Property Protection Methods of the current embodiment provide a means for meeting participants to rate the effectiveness of a meeting or score the degree of association with meeting content. This method is helpful to properly assign the originator of an idea (based on learned content) expressed in a meeting. For example, it could be helpful to accurately name inventors in R&D gatherings or such environments where attribution is crucial (i.e., sales, etc.).

Method steps of this embodiment include:
(1) When a meeting is completed, participants are offered a user-interface to rate the effectiveness of the presenter(s) and the overall score of the meeting.
(2) Participants can also be tagged with ownership or degree of contribution for ideas that were expressed during the discussion.
(3) The system either auto-generates the ideas that were expressed or offers participants to mention the key topics or ideas that were raised and who conceived them.

G. Highlight Reel Meeting Output to Improve Collaborator Efficiency

Methods of the current embodiment provide a "reel" during the meeting that is available to encapsulate the different media events, including video content (slides displayed, etc.), audio overview, public chat instances, and the order in which each stakeholder participates (e.g., "Sonny's Moments: 2:28, 4:34; 8:45").

Method steps of this embodiment include:
(1) When a communication session is underway, all the events that were underway, including video, audio, chat, and presence indicators for each participant, are recorded.
(2) The audio recording is transcribed, and video facial recognition technology may be applied as well to isolate the identity of the participants.
(3) Events are then added to the resulting output to create highlights, such as the time each participant spoke, links to specific moments (i.e., when user x joined or exited, beginning of presentation), an interactive timeline (topics introduced), and even a quick catch-up option that accelerates the reel to avoid wasting everyone's time recapping the missed portions.

Advantageous aspects of the current embodiment may include, but are not limited to:
Links allow users to jump to specific moments in the reel and allow late (or distracted) participants to catch up quickly.
The reels are also standard output to elevate meeting output to include all the events and not just record the audio or video.
Moderators or participants can manually tag reels to allow follow up at specific moments during the collaboration.

H. Participant Reaction Based Voting for Meetings

Methods of the current embodiment equip meetings with voting options just like agenda items; furthermore, goals/tasks are scored using a similar technique. The exemplary system may measure outcomes using emoji-based lexicon and, for example, move off an agenda item depending upon what input is provided by participants to determine outcomes (such as move forward, stall to discuss further, etc.). Specific emojis could create a more collaborative technique to determine a user's sentiment regarding a meeting response: Fewer words are required, unhappy emoji is more palatable than "I don't like the idea," "as much as I believe the strategy to . . . it adds more risk, we need to be more conscious of time to market, I vote to proceed" as opposed to a 'meh' or slightly enthusiastic emoji.

Today, emoji-based interaction is prevalent, as well as requests, such as to "Like" or "Dislike" content; however, it is used rather informally and not used in measuring outcomes of workplace gatherings. The current embodiment provides the full spectrum of emotional indicators from a systematic morphology to apply decision-making and evaluation within a meeting apparatus.

Method steps of this embodiment include:
(1) A meeting-based lexicon is submitted by the organizer of a meeting. It may be a more restrictive set of emojis or a more flexible set of emojis, like in a brainstorming session (no wrong answers).
(2) During a meeting OR at the end of a meeting, the facilitator may invite participants to use small digital images or icons from the lexicon to express an idea or emotion regarding the subject matter in the meeting.
(3) The participants react to specific discussion points that the facilitator served through the meeting apparatus.
(4) The facilitator receives the results and can interact further with the participants to understand why they reacted in the way they did (for example, "Zoe, you expressed confusion over the proposal. Can you elaborate?").
(5) The results are archived and may be matched with user's input to create an irrefutable record regarding voting tendencies for later reference.

Advantageous aspects of the current embodiment may include, but are not limited to:
Throughout the conversation, participants add reactions to show support and excitement about the discussion.
Participants also have the option to thumbs up different sections to show that they agree with the topic being discussed.

I. Methods of Gamification for Unified Collaboration and Project Management

The methods of the current embodiment provide the outcomes of workplace situations, such as decision-points, assigning responsibility, and solving problems to be determined based on the gamification of content derived from a discussion. The discussion may be an online discussion or as part of a meeting facilitator function monitoring a live discussion (i.e., user with mobile app at a café with stakeholder(s) at a table).

Method steps of this embodiment include:
(1) Content is generated from a discussion. The content may be derived from an online meeting (transcription; keyword detection; topic detection; etc.). Content may also be based on a live discussion that is recorded for post-processing (i.e., recording; transcription; keyword detection; topic detection; etc.).
(2) During the meeting, the gamification function is applied depending on user preferences and presents the participants with quizzes or challenge-phrases to verify the stakeholders are aware of what was just presented, etc. In another embodiment, an alternate game (other than just a word game or quiz) may be played to achieve a result designed by the facilitator (facilitator pre-configuration and entry into a game template-construct leads to a desired result that is to be achieved by the participants until the next phase of the meeting can continue).
(3) In another embodiment, the system may display a set of findings that become the basis of a game requiring interaction by the participants. Rules may be applied preventing the participants from moving to the next agenda item until a team or individual goal is achieved. A game structure is created to allow it to be populated with content derived from the meeting.
(4) In another embodiment, the facilitator can offer participants games to decide who is assigned actions. This goal-oriented approach is intended to invite interaction and learn about work-oriented subject matter.

Advantageous aspects of the current embodiment may include, but are not limited to:
Unassigned meeting actions and tasks are determined based on the outcome of quick games between participants.
Actions that are not completed on time result in gaming concepts being applied, such as "You're in the penalty box."
Quick games may also resolve unassigned tasks and goals, e.g., TBC, Tic Tac Toe, Hangman.
The idea of using gaming strategy to solve problems is also interesting because it can result in the participants engaging in such concepts as "before we can end this discussion, we need to open the Chest of Jewels OR open the secret portal. How do we do that? Answer: Come up with 5 tasks that will help us achieve the project deadline."

J. Ultrasonic Beaconing

Methods of the current embodiment include using ultrasonic messaging in a communication system to enable each device logged into a meeting (audio or audio+ video) to broadcast a unique device identifier. Every device that has a microphone capturing audio could then listen for ultrasonic messages that indicate another device that is on the call within audible proximity. This device proximity data would be transmitted to the CloudLink™ Meeting Platform, allowing a provider to orchestrate the user experience of collaboration devices that are co-located.

Method steps of this embodiment include:
(1) All audio lines broadcast an ID every X number of seconds @ 19 kz—or near ultrasonic sound.
(2) The cloud application, or equivalent, of the present embodiment has an awareness at all times of devices that are within audio range of each other.
(3) When there is more than one device present, the cloud application is aware of which user it belongs to.

(4) The Cloud Link Meeting Platform is then aware of the roles of each device in the meeting.

K. Automatically Discovering Collaboration-Enhancing Devices, Such as Displays, Cameras, Speakers, and Microphones Methods of the current embodiment provide the ability to discover and utilize collaboration hardware to add to the value of meeting experiences when at least one participant is in a conference room. This analysis can determine the ability to discover devices that are most likely to exist inside of a "Huddle Room," which is defined as a small conference room with common off-the-shelf displays, cameras, speakers, and phones. The system of the current embodiment includes the programmatic (auto) discovery of devices using either a Mac/Windows computer or iOS/Android device.

Method steps of this embodiment include:
(1) System detects all possible devices, even those considered not compatible.
(2) System connects through an open media connection that permits communication (i.e., SMS, email, WiFi attempt (Bonjour, iMessage, etc.), social media, etc.).
(3) User is offered a collaboration link, such as a meeting invitation.
(4) Alternatively, system maintains a list of trusted connections, apps, and users to determine a path of connectivity to offer the user a link or other means to connect to the meeting.

L. Autonomous Meeting Facilitator

Methods of the current embodiment provide an autonomous meeting composer, i.e., a system-directed capability that calls meetings with the stakeholders based on an intake of digital information which may be based on keywords extracted from conversations (transcribed from interactions between users), or requirements stated in emails, chat, etc.

Method steps of this embodiment include:
(1) Content source is analyzed for meeting topics, such as risks, actions, planning, goals, etc.
   NLP techniques can be leveraged to isolate words that form the basis of an agenda and the identified participants.
(2) The system then calls a regular meeting (i.e., just a booking; possibly with keywords used to call an agenda and/or meeting purpose/title) OR an enhanced meeting using detected goals, crucial milestones, etc. to work towards key objectives that were identified OR allow participants to set their deadlines. Participants may also create additional goals or tasks or modify system generated ones.

Advantageous aspects of the current embodiment may include, but are not limited to:
   Actionable items are generated based on transcribed content.
   Participant's availability is used to book completion of previously identified goals, plus add new ones in a meeting.
   Stakeholders don't initiate closing of a goal or task; the system autonomously books key engagements with identified stakeholders with measurable outcomes.

M. Advising Meeting Participants of their Contributions Based on a Graphical Representation ("Heat Map")

Methods of the current embodiment provide a collaboration system configured to measure the contributions of its participants and present the contributions using graphical representations ("heat maps;" classic metering, scoring, etc.).

Method steps of this embodiment include:
(1) Participants in a collaboration session (i.e., meeting)—not necessarily an online discussion, since tracking participants in a live discussion is possible using smartphones—using, for example, speech recognition techniques, such as speech format characteristic detection OR device detection OR caller-identification, etc.
(2) Metrics are gathered and maintained for each speaker, for example, frequency of words spoken, speaker duration, primary engagers (i.e., when you speak, this person interacts with you the most).
(3) The system prompts each participant AND/OR the facilitator/leader on the level of participation. User may be prompted by the system to engage more. Facilitator may prompt a participant to engage more. System may prompt a participant to engage less when a particular speaker talks. System advises all participants on their level of effort in the collaboration session (shows how much they are speaking; graphical display; colored alerts). System throttles down the discussion based on speaker traffic (i.e., system-initiated breaks, breathing exercises, video game, automatically raising a hand for a less engaging speaker, etc.).

Advantageous aspects of the current embodiment may include, but are not limited to:
   System helps a participant more effectively engage the other participants in a meeting equally using a 'contribution heat map' function.
   Visual cues are used in real-time to steer the conversation towards the meeting goals.

N. "Shoulder Tap," Aka Lightweight Intrusion Technique to Ask a Question During a Collaboration Session Methods of the current embodiment include a subtle meeting intrusion, thereby not interfering with an ongoing collaboration session. The methods can also be used to hold off an intrusion and deliver it later OR itemize it for closure at a later date, like a meeting action. Traditional applications merely offer a screen pop to inform the user of transient content.

Method steps of this embodiment include:
(1) During a collaboration session, when a co-participant has a query or suggested action for another participant, the system offers a new media session to be created (i.e., video call) to foster interaction, e.g., the system offers a video session OR audio message within a meeting already underway.
(2) System determines the level of engagement, such as the participant is reading a document or presentation, talking, hearing a response to a question that they asked, or temporarily away from their desk. If a user is distracted or busy (based on system detection), the "shoulder tap" is delayed until the user is available. If the user is busy, then they can leave a message (voice note; pending question to be answered; etc.).
   Evolution of call waiting for collaboration.

O. Smart Meeting Detection (Aka "Scouting") as a Service

Methods of the current embodiment include skillset matching for the purposes of including proper personnel in cross-functional and self-directed environments. The improvement to professional development by speeding up the decision-making, allowing hosts/facilitators to factor in the availability of the right experts for meetings and giving participants new ways to contribute their perspective leads to an optimal collaboration experience. Far too often, the right people are not available OR a meeting is booked, positing that by calling the meeting, it should preclude that the right people attend. However, the trend in the industry is towards teams that are cross-functional and self-directed, meaning that people with varied expertise and background may be called upon in the absence of a classic expert.

Method steps of this embodiment include:
(1) When a meeting is proposed, the system refers to a database for the skillset-related keyword matches, i.e., the meeting agenda, title, and skillset arrays based on previous meetings is leveraged.
(2) If a participant is not available, the system pushes similar skillsets highlighting expertise not previously known, based on user profiles created by users themselves and/or management (résumés, performance reviews, Social Media, etc.)

Advantageous aspects of the current embodiment may include, but are not limited to:
makes meeting participant recommendations for hosts to consider;
invites participants based on the selected topic and the individual's expertise;
advises when a participant is overloaded or overtasked;
individuals can indicate their invite preferences, and non-critical teammates have the option to delegate the responsibility of attendance to a human colleague or to their artificial alter-ego;
alter-ego helps non-attendees create a video recording of their perspectives while voicing over key documents;
system introduces this alter-ego or surrogate representation at the right time in the meeting while they are not in attendance;
solves the problem of meeting-overload; and
employees can divulge their areas of expertise to equip the system with proper skills to delegate automatically.

P. Expression Engine

Methods of the current embodiment provide a means to express ideas during a collaboration session that spawns collaboration related interaction. For example, if users can sketch a diagram to communicate, then the system uses built-in webcams OR a smartphone camera to integrate the expression, then additional tools become available, such as supplementing the diagram with voiceovers, which can be attached to sketches as users record their drawing, which are auto-transcribed to add more nuance and explanation to the visual. This would be very useful in mechanical design environments or in architecture. However, it can also be used in project management and software design sub-disciplines. Furthermore, the system could also adapt an idea expressed and polish it up or enhance it for presentation mode.

Advantageous aspects of the current embodiment may include, but are not limited to:
The receiver can easily annotate further on this idea, transforming the sketch into an infinite digital whiteboard.
Workers can also seamlessly transition into live collaboration from the main expression canvas space or chat, which maintains the original chat context and live transcribes the meeting to feed back into the chat.
A participant can sketch an expression of their meeting-related idea, then using Google™ image recognition, optionally serve up related imagery to assist a user in expressing their idea. This dynamic search setting can be disabled.

Q. Surrogate Meeting Representation

Methods of the current embodiment include a virtual surrogate that collects and provides input from attendees who cannot attend to ensure absentees' voices are heard. The system learns using natural language processing and machine learning to process dialog and deliver responses that are based on a known corpus familiar to the primary stakeholder. Generally, the technique relies on a general corpus to understand what users are saying to interpret meeting-oriented dialog and a custom corpus to create a most relevant lexicon where the tacit knowledge resides to assist the user in building relevant responses based on their body of work and subject expertise.

Surrogate meeting representatives are different than avatars that are being used already by meeting and collaboration providers.

Method steps of this embodiment include:
(1) When a user is not available to attend a meeting, the user initiates a meeting surrogate.
(2) The meeting surrogate is then able to process the natural speech provided by the participants.
(3) If/when prompted for the key stakeholder who is unable to attend to elicit a response, the system generates a response based on the body of knowledge that is based on a time-relevant snapshot of data (emails, presentations, previous conversations, etc.). The system may even support turning off the auto-pilot temporarily (perhaps they are busy and listening in, therefore they can monitor and barge in on the surrogate to override responses and deliver a specialized one).

R. Icebreaker Generator

Methods of the current embodiment propose a system-level intermission or "icebreaker" to be generated whenever meetings get monotonous or if a facilitator can predict the point at which a break is required. Research shows that participants get comfort and enhanced productivity by collaborating and contributing content, ideas, etc. after an icebreaker. However, current systems do not include such events built into a collaboration facility or meeting scheduler.

Method steps of this embodiment include:
(1) Facilitator or leader books a meeting.
(2) The configuration interface allows the facilitator to predict when an icebreaker is required.
It may be when a number of users start getting fidgety (i.e., after start-time, when room ambient noise amplitude suggests an icebreaker).
System may only notify the facilitator.
(3) Alternatively, if the system is programmed to "break the ice" every 45 minutes, for example, the screen changes and a planned event is displayed (e.g., GIPHY, suggested clip from a library of clips, or a funny audio clip is played for audio-only participants).
(4) The system is aware of when breaks are required (timed or audio detection).

However, participants can also lobby for an icebreaker, which may consist of a "bio break" followed by, or concurrent with, the "icebreaker."

Advantageous aspects of the current embodiment may include, but are not limited to:

System automatically cues participants with an automatic icebreaker that is generated following a few different triggers, such as, for example, meeting length, dispute detection, dialog-complexity detection (NLP=off-topic detection; complex language being used; remarkable spaces between responses, i.e., lethargy, etc.).

S. Meeting Kickstarter

Methods of the current embodiment include aggregating a meeting's content and creating a summarization to preempt the discussion and increase participant engagement.

Method steps of this embodiment include:
(1) When a meeting is being staged, the exchange of information between the stakeholders is monitored.
(2) System aggregates the relevant content between stakeholders OR shared in a common space. Information is mined and analyzed for topics (NLP).
(3) System parses the keywords using adjustable methods to determine the degree of relevance. Keywords and topics are identified plus additional sentences before and after; percentage of supplied context is adjustable.
(4) Context and highlights are moved to a template.
(5) Summary is sent to the stakeholders before the meeting. Preemptively engages the audience (i.e., known recipients) and learned context is summarized in a template.

Advantageous aspects of the current embodiment may include, but are not limited to:
"If you don't attend, here is what you're missing . . . ."
"As you can see, most of this upcoming meeting is a rehash of the earlier discussions. Plan to attend or not accordingly."

T. Dry Run Meeting Facilitator

Methods of the current embodiment include facilitation of meeting presenter's "dry run" of meeting content and obtaining feedback on their delivery.

Method steps of this embodiment include:
(1) A presenter of prepared meeting content (PowerPoint, Keynote, etc.) selects "simulation" mode.
(2) The simulation mode allows the user to present their content, while the system monitors:
system monitors the spoken content AND/OR the written words.
(3) System applies rules of conformance based on social settings (formal, informal, etc.). Detection of wordiness is executed, and changes are recommended through annotations or scoring on passages of text (findings in report).
(4) Presenter's delivery of content is evaluated as well. A "keynote evaluation" mode might provide voice coaching to optimize orator's skills. Rapid word detection, i.e., "please slow down;" amplitude detection, i.e., "please speak louder" . . . OR "more softly;" tonality detection, i.e., "You sound monotone: Please try to annunciate your spoken sentences more."
(5) Additional function allows test audience to annotate content while watching or listening to the presenter deliver content. As an annotation tool, this function allows users to directly interact with and apply updates to the content that is being driven by the presenter.

Advantageous aspects of the current embodiment may include, but are not limited to:
provides a more collaborative way to get review feedback by seeing presentation decks in action; more effective simulation of delivery;
audience is furnished with functions to evaluate speaker AND content;
test audience can also provide live feedback similar to broadcasted debates where audience upvotes or downvotes during the presenter's dry-run; especially helpful for seasoned veterans (i.e., CEOs, etc.);
system also provides automated coaching in private tutoring mode; and
system can also automatically generate a meeting script based on past sessions; system uses a past-recorded meeting database to aid inexperienced presenters; and system applies NLP techniques to suggest preamble, idiomatic expressions, etc., generate small-talk, etc.

U. The Non-Meeting Generator

Methods of the current embodiment provide participants a means to determine measurable outcomes before a meeting has occurred to, for example, determine if the goals have been met, and therefore the meeting is no longer required. When a meeting needs to be called, the participants often "blindly" attend, not knowing if the objectives have already been met. If, however, a non-meeting generator could facilitate the initial entry and tracking of goals or actionable items, then when a to-do list is properly checked off, a meeting does not have to be called anymore.

Since online "to-do" lists exist already, if a meeting facility or event scheduler was intelligent enough to leverage artifacts, such as minutes, video-conference footage, transcription services, etc., and able to formalize the words used (based on descriptions of problems derived from a sentential calculus), then it may be possible to create a statistical method to determine an outcome, such as solving the problem of whether or not to book a meeting, to update an existing meeting, or to cancel a meeting entirely.

V. Digression Detection and Avoidance ("Conversation Parking Lot")

Methods of the current embodiment include a meeting system or scheduling application configured to conduct analysis of disparate conversations that are not contributing to the measured outcomes OR agenda items during a collaboration session.

Natural language processing can be used to isolate side conversations by listening in using an ultra-sensitive microphone or remote satellite microphones. Furthermore, smartphones equipped with productivity software can monitor the audio levels during key discussions and alert the facilitator that a participant has been identified that may be distracted or is conducting a separate conversation.

If the system detects a participant is holding a separate conversation, etc., it may prompt them "Would you like to park this conversation on the topic of XXXX?" This encourages the participants to pick up the dialog later (perhaps book a reminder via another form of media OR invite someone for a post-meeting chat), as opposed to simply being alerted that the participants are creating noise and to end the side chat which may be crucial despite the fact the topic was off-topic.

Method steps of this embodiment include:
(1) Conversation during a meeting is underway between participants.
(2) System monitors all the devices that are registered with the conferencing or meeting software.
(3) System alerts facilitator that distractions are detected.
(4) System may offer a follow-up discussion be created that is derived from the keywords included in the distraction.
(5) Alternatively, the user is notified that they are distracted OR that the meeting participants are distracted.

W. Virtual Meeting Attendee

A method of the current embodiment includes techniques that, if a participant is unable to attend a meeting, they can opt to send in the meeting filler.

Method steps of this embodiment include:
(1) Meeting invites a user to attend.
(2) User cannot attend the meeting so assigns a virtual attendee or delegate.
(3) Virtual meeting attendee listens for certain keywords identified by the user ahead of time.
  User enters a list of keywords they want to either be notified about OR to trigger a response from the virtual meeting attendee.
  User enters keywords they would like extracted from the meeting.
  Standard transcription would detect every word spoken, including content that is simultaneously being presented.
  User can adjust the amount of context desired and system may supply relevant content for later consideration.
  The system can also supply system responses in the form of a synthetic voice-assistant based on a scripted response provided by the user OR in the form of a text-based response. During a meeting, the system may time a response based on a command from the meeting participants OR be prompted to virtually present when a command is issued by the meeting platform.

X. Tinder for Work

A method of the current embodiment includes a "matchmaking at work" system based on professional attributes as opposed to personal. Professional workforces demand their workers be strong in certain skills depending on the role. Matchmaking that allows a worker to highlight certain skills they would like to develop in addition to certain key interpersonal strengths to ensure compatibility encourages more effective knowledge transfer and mentoring. Management can even encourage relationships between workers based on compatible attributes and requirements.

Method steps of this embodiment include:
(1) System recommends certain skillset be targeted based on management need or in the event a worker leaves the organization.
  a database or record of the skillset requirement is created (i.e., employee changes, hiring requisitions, etc.).
  many workplace management utilities manage and centralize this type of data (e.g., Concur).
  skillsets and experience may be mined from existing HR databases, too, including résumé-based searches, social media, etc.
  employee mentorship programs also identify personal goals and opportunities (e.g., if SW Development wants to move to Product Management; has business diploma from XYZ College).
(2) The requirement is fulfilled using a meeting application or calendar booking utility. System automatically detects requirements based on attendees present vs. those who cannot attend.
  when an employee is not available OR if the required skillsets identified within the meeting application are not available, the system pushes new skillsets based on their availability.

Y. Auto Status Visualizer

A method of the current embodiment "scrapes" the activities and situational data of workers and then auto populates their customized avatar with current status and availability. The methods drive status updates based on IOT sensors, smartphone location services, fitness gear biometric readings, media preferences (e.g., "Parker is listening to Rush on his laptop and is working on two presentations at the home office.").

Ultra-dynamic status indication is based on the idea that people's status is directly tied to their personal device status (smartphone, vehicle, watch, fitness/health tracker, computer, IOT endpoints, etc.). For example, remote workers need extra context about what activities are happening in the office. It helps people at work and especially remote workers maintain balance, focus and avoid interrupting situations where they would otherwise be able to see someone's obvious status while in the office.

Standard presence is replaced with hyper presence OR ultra-dynamic status, such as "Downloading a file," "Avoiding distractions," "Dealing with a crisis," "Walking to the . . . ," "Buying snacks or drinks at the vending machine," "talking to Mark at the photocopier," "Mark is eating lunch at Jojo's desk," "Watching a Tonight Show clip on his iPhone in the courtyard," etc. While remote workers benefit by a more detailed status other than the generic status updates, this idea ensures people are more in tune with their work environments and how they interact with them. The system relies on device presence and user presence; IOT drives more dynamic updates; "Jojo is freezing his hands off at the bus shelter."

The systems and methods disclosed herein collectively address the needs of meeting users by getting more utility out of the information that is supplied to collaboration and event scheduling applications. Furthermore, the methods and ideas disclosed allow users to increase their productivity based on the detection of such information and by applying techniques not traditionally used in meeting applications to create a more results-oriented experience that is more engaging and to make meetings more effective.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be standalone or combined in any combination. It will be recognized that changes and modifications may be made to the exemplary embodiments without departing from the scope of the present invention. These and other changes or modifications are intended to be included within the scope of the present invention, as expressed in the following claims.

The invention claimed is:

1. A method of advising meeting participants, comprising:
    establishing a desired engagement level for a participant of a meeting;
    evaluating a contribution to the meeting of the participant based on the desired engagement level and including at least one of detecting a communication duration of the participant or determining a quantity of content shared;
    generating a graphical representation of the contribution to the meeting; and
    providing the graphical representation of the contribution to the meeting, including transmitting a signal to at least one of the participant or a meeting host, the signal communicating the graphical representation to a device of the participant or the meeting host.

2. The method of claim 1, wherein the participant is one of remote or local, the participant communicating over a communication service when remote and communicating with at least some participants in a single location when local, evaluating the contribution to the meeting is in real time and includes one of identifying the participant using an identification number for the participant on the communication service or identifying the participant using voice recognition when the participant is in the single location.

3. The method of claim 1, wherein establishing the desired engagement level for the participant further comprises establishing the desired engagement level for the participant by at least one of the meeting host, a facilitator or a manager.

4. The method of claim 1, wherein the graphical representation of the contribution to the meeting comprises at least one of a heat map, a scoring, a graph, a classic metering, or a color coding comparing the contribution to the meeting to the desired engagement level.

5. The method of claim 1, wherein, when used, the communication duration is at least one of a speech duration, a chat duration, or a video duration of the participant and the contribution of the participant is a frequency of words by the participant.

6. The method of claim 5, wherein a color coding comprises at least one of red for no participation, yellow for warning about low participation, and green for good participation level.

7. The method of claim 1, further comprising tracking the participant during the meeting using speech recognition techniques.

8. The method of claim 7, wherein tracking the participant during the meeting using the speech recognition techniques includes at least one of speech format attribute detection, device detection, or caller-identification recognition.

9. The method of claim 1, further comprising recording evaluated metrics and gathered information about each participant's speech duration and their continued involvement.

10. The method of claim 9, wherein the recording evaluated metrics are gathered and maintained for the participant, the recording evaluated metrics including at least one of frequency of words spoken, speaking duration, or primary engagers.

11. The method of claim 1, further comprising signaling the participant or a host according to evaluated results metrics.

12. An apparatus for advising meeting participants, comprising:
    at least one processor; and
    a memory coupled to the at least one processor, the memory including instructions causing the at least one processor to:
        establish a desired engagement level for a participant of a meeting,
        evaluate a contribution to the meeting of the participant based on the desired engagement level and including at least one of detecting a communication duration of the participant or determining a quantity of content shared,
        generate a graphical representation of the contribution to the meeting, and
        provide the graphical representation of the contribution to the meeting, including transmitting a signal to at least one of the participant or a meeting host, the signal communicating the graphical representation to a device of the participant or the meeting host.

13. The apparatus of claim 12, wherein the participant is one of remote or local, the participant communicating over a communication service when remote and communicating with at least some participants in a single location when local, evaluating the contribution to the meeting is in real time and includes one of identifying the participant using an identification number for the participant on the communication service when remote or identifying the participant using voice recognition when the participant is in the single location.

14. The apparatus of claim 12, wherein establishing the desired engagement level for the participant further comprises establishing the desired engagement level for the participant by at least one of a facilitator or a manager.

15. The apparatus of claim 12, wherein the graphical representation of the contribution to the meeting comprises at least one of a heat map, a scoring, a graph, a classic metering, or a color coding comparing the contribution to the meeting to the desired engagement level.

16. The apparatus of claim 12, wherein, when used, the communication duration is at least one of a speech duration, a chat duration, or a video duration of the participant and the contribution of the participant is a frequency of words by the participant.

17. The apparatus of claim 16, wherein a color coding comprises at least one of red for no participation, yellow for warning about low participation, and green for good participation level.

18. The apparatus of claim 12, the memory further including instructions causing the at least one processor to track the participant during the meeting using speech recognition techniques.

19. The apparatus of claim 18, wherein tracking the participant during the meeting using the speech recognition techniques includes at least one of speech format attribute detection, device detection, or caller-identification recognition.

20. The apparatus of claim 12, further comprising recording evaluated metrics and gathered information about each participant's speech duration and their continued involvement.

* * * * *